United States Patent
Lincoln

[15] 3,651,620
[45] Mar. 28, 1972

[54] GAS SCRUBBER

[72] Inventor: Roland L. Lincoln, Macungie, Pa.
[73] Assignee: Fuller Company, Catasaugua, Pa.
[22] Filed: Apr. 22, 1970
[21] Appl. No.: 30,670

[52] U.S. Cl. ................................55/228, 55/249, 55/468, 261/117
[51] Int. Cl. ........................................B01d 47/00
[58] Field of Search ...............55/248, 249, 228, 256, 468; 261/117, 76, 78 A

[56] References Cited

UNITED STATES PATENTS

| | | | |
|---|---|---|---|
| 1,781,742 | 11/1930 | Anglemeyer | 55/248 X |
| 2,233,520 | 3/1941 | Vigan | 55/249 X |
| 3,444,668 | 5/1969 | Masuda | 55/228 X |
| 3,464,189 | 9/1969 | Mergenthaler | 55/468 X |
| 2,091,421 | 8/1937 | Sherman | 55/249 X |

*Primary Examiner*—S. Leon Bashore
*Assistant Examiner*—Robert L. Lindsay, Jr.
*Attorney*—Jack L. Prather, Frank H. Thomson and John L. Sigalos

[57] ABSTRACT

The instant invention relates to a gas scrubber for cleaning dirty gas comprising an enclosed vessel having bottom, top and side walls, means dividing said vessel into upper and lower compartments, the bottom portion of said lower compartment defining a settling basin, at least one substantially vertically disposed open-ended gas collecting tube extending through said dividing means into both said compartments, an atomizing nozzle in said lower compartment positioned below each said gas collecting tube so as to discharge a mixture of a scrubbing liquid and a compressed gas upwardly into each said gas collecting tube, and means for circulating scrubbing liquid from said settling basin to said atomizing nozzle.

12 Claims, 2 Drawing Figures

Patented March 28, 1972 3,651,620

INVENTOR
ROLAND L. LINCOLN

BY
Pennie, Edmonds, Morton, Taylor & Adams
ATTORNEYS

GAS SCRUBBER

BACKGROUND OF THE INVENTION

High energy, high efficiency scrubbers are necessary for the most effective removal of dirt and other particulate materials from dirty gas. Such scrubbers require that certain basic conditions be met. These are that there be a very high differential velocity between the scrubbing liquid and the dirty gas to be cleaned, that there be a very large scrubbing liquid surface, and that there be a very high turbulence between the dirty gas and the scrubbing liquid surface. Other factors, of course, such as cost, power, space, maintenance and reliability are to be considered but the three basic conditions set forth above are essential for high efficiency. Such efficiency is particularly needed now as more stringent regulations are being invoked with respect to the cleaning of dirty gases before they are vented to the atmosphere in order to prevent air pollution.

Presently there are two main types of commercial installations for the scrubbing of dirty gases. These are broadly classified as Venturi type scrubbers and flooded disc type scrubbers. In both, an induced draft fan is required to overcome the pressure loss of the gas as it passes through the scrubber and exhaust system. Because of the temperature of the gases and the dust loading in them, particularly as such gases come from furnaces, it is necessary to locate the induced draft fan after the scrubber. This requires high energy and fan speed in order to move the gas through the scrubber at the desired speed in order to obtain the high differential velocity between the scrubbing fluid and the gas to be cleaned. Such high fan speeds are exceedingly dangerous and result in excessive scrubber shutdowns when moisture or dirt buildup on the fan blade causes imbalance of the fan.

Moreover, with Venturi type scrubbers, there is a limited gas volume range that can be used at high efficiency without employing a variable throat area. In addition, in such Venturi type scrubbers, the scrubbing fluid is added at low velocity and at right angles to the flow of the dirty gas and adds nothing to the turbulence or differential velocity required to clean the gas but actually consumes energy from the high velocity gas stream.

These recognized deficiencies of Venturi type scrubbers have led to the use of flooded disc scrubbers which overcome some of the drawbacks of the Venturi type. Here, high gas velocity is still used but an abrupt expansion provides the desired high turbulence. Still, the scrubbing fluid is introduced at low velocity and at right angles to the gas flow and thus tends to consume some energy from the high velocity gas stream. Also, the energy required to be added to the gas volume results in the fan troubles common to the Venturi type device and the flooded disc scrubber still requires adjustment of moving parts within the scrubber for any change of gas volume.

SUMMARY OF THE INVENTION

A gas scrubber has now been found which eliminates the need for high fan speeds to build up high gas velocity and which permits the reuse of dirty scrubbing liquid without concern as to plugging of the spray nozzle through which clean scrubber fluid is discharged against the dirty gas stream.

Briefly stated, the invention comprises a gas scrubber comprising an enclosed vessel having bottom, top and side walls, means dividing said vessel into upper and lower compartments, dirty gas inlet means in said upper compartment, clean gas outlet means in said lower compartment, at least one substantially vertically disposed open-ended gas collecting tube extending through said dividing means into both said compartments, the inside of each gas collecting tube being substantially completely open throughout its length the bottom portion of said lower compartment below the bottom end each of said gas collection tube defining a settling basin, at least one atomizing nozzle, and means for circulating scrubbing liquid from said settling basin to each atomizing nozzle, and means for supplying compressed gas to each atomizing nozzle for atomizing the scrubbing liquid and accelerating it to a high velocity, each atomizing nozzle being positioned in said lower compartment below a gas collecting tube for discharging a mixture of atomized scrubbing liquid and compressed gas upwardly into said gas collecting tube countercurrent to the flow of dirty gas whereby high energy contact is achieved between the dirty gas and the atomized scrubbing liquid.

BRIEF DESCRIPTION OF DRAWINGS

The invention will be more particularly described with reference to the illustrative embodiments thereof, wherein.

DETAILED DESCRIPTION

Figure 1:
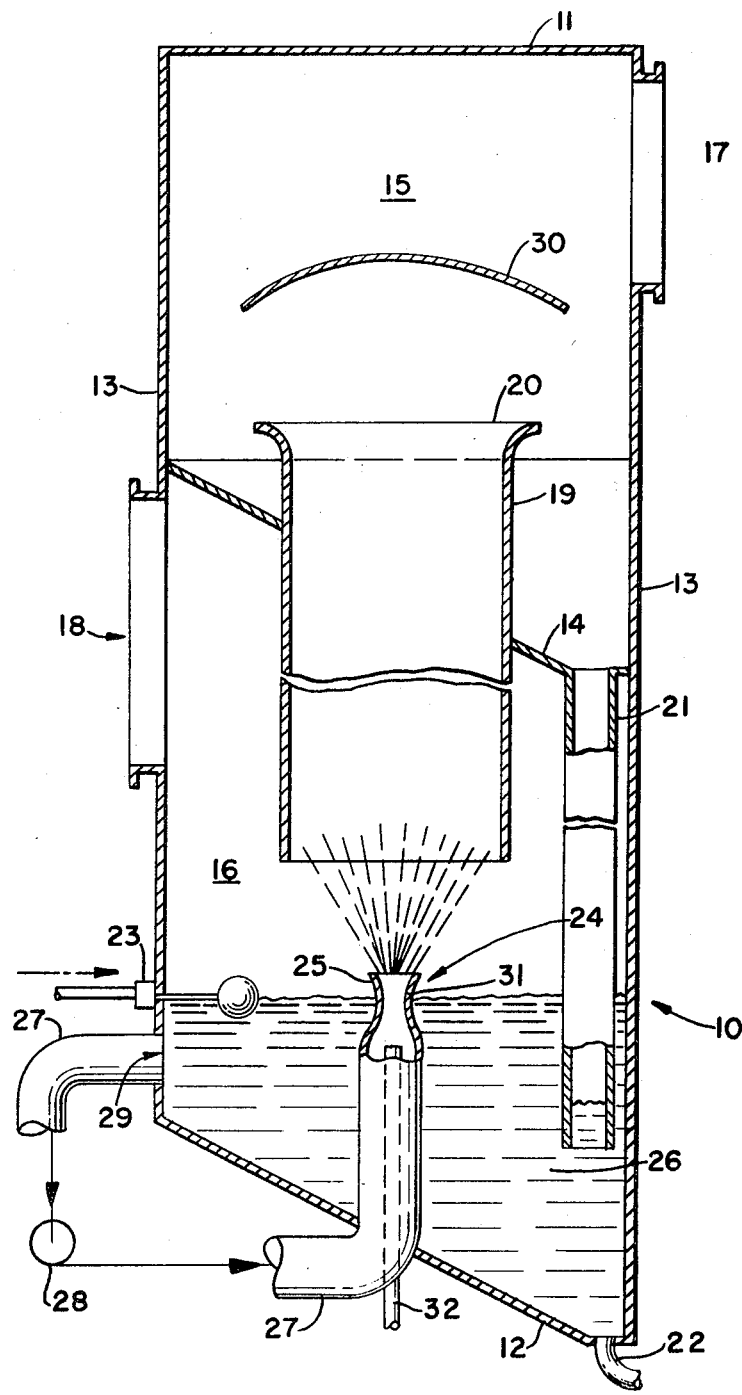
FIG. 1 is a sectional view of a gas scrubber of the instant invention.

Referring to the drawings, there is shown a gas scrubbing vessel generally indicated as 10 comprising top 11, bottom 12 and side walls 13, preferably made of metal. A division plate 14 attached to the walls 13 divides the vessel into upper 15 and lower 16 compartments. While shown in a sloping position, the plate 14 may also be in a substantially horizontal position.

An opening 17 is provided in the upper compartment 15 for connection with tubing (not shown) connecting the scrubber to the source of dirty gas. A clean gas outlet 18 is provided in the side wall of the lower compartment 16 for removal of the clean gas from the scrubber. In some cases it may be desired to pass the clean gas through a conventional mist eliminator in order to insure that any scrubbing liquid entrained by the gases is removed before the gas is further used or vented to the atmosphere. A gas collecting chamber 19 is vertically disposed in the vessel and extends through the division plate 14. It is open at both ends, and in a preferred embodiment shown in the drawings is flared at its inlet portion 20.

The division plate 14 may be provided with a scrubbing liquid conduit 21 which, as hereinafter described, conveys scrubbing fluid settling in the upper compartment 15 to a settling basin. The bottom 12 of the vessel 10 is sloped and is provided with a sludge removal opening 22 from which the sludge (dirt and other particulate materials) removed from the gas can be removed from the vessel. The sloping bottom 12 of the vessel 10 and the side walls 13 combine in the lower portion of the compartment 16 to form a settling basin in which scrubbing liquid is kept at a predetermined level by means of a float valve 23 which permits the addition of makeup scrubbing liquid to maintain the desired level.

An atomizing nozzle 24 having its discharge orifice 25 above the level of the scrubbing liquid 26 in the settling basin is positioned in the lower compartment so as to be able to discharge a mixture of scrubbing fluid and compressed gas from the orifice 25 directly into the gas collecting chamber 19. The atomizing nozzle 24 is connected by means of suitable piping 27 to a recirculating pump 28 and to a discharge opening 29 for the scrubbing liquid in the settling basin.

The scrubber may be provided with a deflector plate 30 mounted to the walls which acts to deflect any of the scrubbing liquid which may not act on the gas as it passes through the gas collecting chamber 19.

The atomizing nozzle 24 has a flared discharge orifice 25 and a restricted throat 31. Passing upwardly in the nozzle to a point just below the restricted throat 31 is tube 32 for compressed air. In operation, as the scrubbing liquid comes to the restricted throat 31 the energy of the compressed air fed through the tube 32 atomizes the liquid into a fine mist and transports it with sufficient energy upwardly through and into the gas collecting chamber 19 where it comes into countercurrent contact with the downwardly flowing dirty gas.

The operation of the scrubber will be largely evident from the foregoing description but will be further described in connection with a scrubber having a nominal gas capacity therethrough of 25,000 c.f.m. For such capacity a 22-inch diameter gas collecting chamber 19 is used and the fan used to draw the gas through the scrubber need only be of a size to assure a pressure drop through the scrubber of less than 10 inches. Consequently, no extra high speed fan is required and the danger of any fan blowup is materially reduced.

Under these operating conditions, the downward velocity of the gas (9,500/min.) is not adequate to obtain high efficiency cleaning by itself. The atomizing nozzle 24, however, is designed to accelerate the water droplets to a velocity of over 30,000 f.p.m. At the nominal downward gas velocity of 9,500 feet per minute and an upward water velocity of 30,000 f.p.m., there is an impact velocity of 39,500 f.p.m. or over 650 feet per second well above the usual venturi velocity of 400 feet per second. It is recognized that this velocity will not be maintained but will be slowed down by the impact of the water droplets on the gas. It is this differential velocity which gives the high collection efficiency.

By putting the energy into the water instead of the gas, there is obtained the same impact and energy but at a materially reduced induced draft wheel tip speed. This reduces the danger of abrupt failure when mud is deposited on the wheel, an unfortunately too common an experience in existing scrubbers.

By using compressed air to provide the high velocity of the water droplets, the use of high pressure water pumps and piping is avoided as is the need for small diameter ports. The combination of small ports and high velocity of water through them is troublesome when recirculating dust laden water with possible corrosive fluids dissolved in the water. With the atomizing type nozzle, the air is compressed clean and permits openings of at least one-half inch in both the air and water ports in the nozzle. The use of the compressed air also permits break up of the water into a fine mist with a very large surface area, a necessary requirement for high efficiency scrubbing. The introduction of the necessary energy through the air compressor instead of the fan thus has many advantages.

The water supplied to the nozzle is supplied by recirculating pump 28 as it is received from the discharge opening 29. This minimizes the amount of water needed to operate the scrubber. Make up water as needed is supplied through float valve 23. Scrubbing water that collects in the upper compartment 15 settles on the division plate 14 and is carried back to the settling basin through conduit 21.

As the water in the settling basin is in a relatively quiescent condition, the dirt and particulate matter entrapped therein during contact of the water with the dirty gas settle to the bottom 12 of the vessel 10 and are removed through sludge removal opening 22.

One of the existing problems of scrubber application is the necessity of maintaining high efficiency with a wide range of gas volumes without the undesirable mechanical movement of parts. With the instant invention this requirement is met automatically. Even a reduction of 20 percent of nominal volume gives an impact velocity of (20 percent of 9,500) + 30,000 or 31,900 f.p.m. or 530 feet per second. The instant invention at 20 percent volume gives a higher differential velocity than other designs at full volume.

Figure 2:
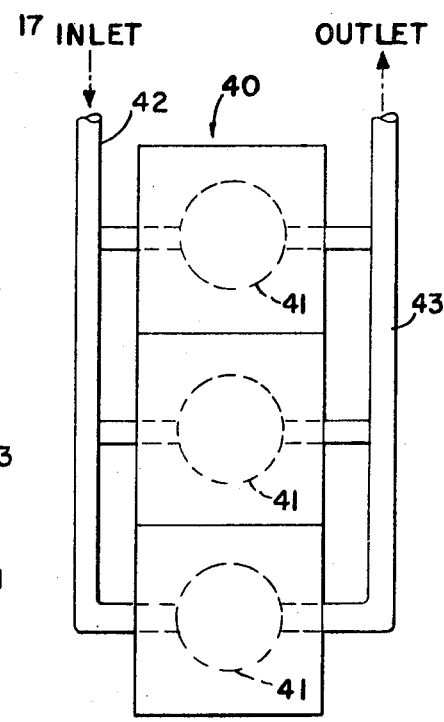
FIG. 2 is a top plan view of a modular form of the instant invention.

Referring to FIG. 2, there is shown a multiple scrubber assembly 40 consisting of three vessels each having gas collecting chambers 41 and other elements of the scrubber as described above. A common intake manifold 42 connecting with the source of dirty gas conveys the gas to the individual units of the assembly 40 and a common exhaust manifold 43 conveys the scrubbed gas away from the individual units.

Thus, scrubber capacity can be varied by either varying the diameter of the gas collector chambers, or forming multiple scrubber assemblies, or a combination of both.

If desired, the deflector 30 could be eliminated. If this is done, the inlet 17 should be at an angle to the housing so that liquid which travels through the gas collecting chamber will not enter the tubing associated with the opening 17. It may also be desirable to lower the height of the housing so that the top 11 is in the position of the deflector 30.

The scrubbing liquid conduit can be eliminated by decreasing the height of the gas collecting chamber 19 so that its upper surface is flush with the division plate 14. In this instance, the chamber 19 will act as a liquid conduit for returning liquid which reaches upper compartment 15 to the settling basin.

As a further modification, the recirculating pump 28 can be eliminated. In order to accomplish this, the opening 29 is closed and the piping section 27 leading from the opening 29 to the pump 28 is eliminated. The piping section 27 leading from the pump 28 to the nozzle 24 is substantially eliminated. The pipe section 27 within the setting basin is cut off so that it is open to the scrubbing liquid at a point below the surface of the liquid and above the point of heavy concentration of sludge. The level of liquid in the settling basin is maintained so that it is slightly above the outlet of compressed air tube 32. As compressed air exists from tube 32 it will atomize the liquid and spray it towards the chamber 19. Liquid will be drawn into the nozzle by the action of the compressed air.

It will be understood that it is intended to cover all changes and modifications of the disclosure of the invention herein chosen for the purpose of illustration which do not constitute departures from the spirit and scope of the invention.

What is claimed is:

1. A gas scrubber comprising an enclosed vessel having a bottom, top and side walls, means dividing said vessel into upper and lower compartments, dirty gas inlet means in said upper compartment, clean gas outlet means in said lower compartment, at least one substantially vertically disposed open-ended gas collecting tube mounted in said dividing means and extending into at least one of said compartments, the inside of each said gas collecting tube being substantially completely open throughout its length, the bottom portion of said lower compartment below the bottom end of each said gas collecting tube defining a settling basin, at least one atomizing nozzle, means for circulating scrubbing liquid from said settling basin to each atomizing nozzle, and means for supplying compressed gas to each atomizing nozzle for atomizing the scrubbing liquid and accelerating it to a high velocity, each atomizing nozzle being positioned in said lower compartment below a gas collecting tube for discharging a mixture of atomized scrubbing liquid and compressed gas upwardly into said gas collecting tube countercurrent to the flow of dirty gas whereby high energy contact is achieved between the dirty gas and the atomized scrubbing liquid.

2. The gas scrubber according to claim 1 further comprising means for maintaining a substantially constant level of scrubbing liquid in said settling basin.

3. The gas scrubber according to claim 2 wherein the bottom of said vessel is sloped and contains, at about its lowest point, means for removal of sludge from said settling basin.

4. The gas scrubber according to claim 2 including scrubbing liquid return means connecting said upper compartment with the scrubbing liquid in said settling basin for return of scrubbing liquid from said upper compartment to said settling basin.

5. The gas scrubber according to claim 2 wherein the discharge orifice of the atomizing nozzle is above the surface of the scrubbing liquid in the settling basin and the nozzle comprises a hollow tube having a discharge orifice and said means for supplying compressed gas to said atomizing nozzle includes means, in said hollow tube for delivering a compressed gas to a point below said discharge orifice.

6. The gas scrubber according to claim 2 wherein the discharge orifice of the atomizing nozzle is above the surface of the scrubbing liquid in the settling basin and the nozzle comprises a hollow tube having a flared discharge orifice, a restricted throat downstream from said orifice, and means in said hollow tube for delivering compressed gas to a point below said restricted throat.

7. The gas scrubber according to claim 6 including at least one open-ended conduit affixed to said dividing means and extending downwardly therefrom a point below the surface of the scrubbing liquid in said settling basin and sludge removal means in the bottom of the settling basin.

8. A gas scrubber comprising a series of scrubbers according to claim 2 wherein the dirty gas inlet means for each individual scrubber is in fluid flow communication with means connected to the source of dirty gas and the clean gas outlet means for each individual scrubber is in fluid flow communication with a common exhaust means.

9. A gas scrubber comprising an enclosed vessel having bottom, top and side walls, means dividing said vessel into first and second compartments, dirty gas inlet means in said first compartment, at least one open-ended gas collecting tube mounted in said dividing means and extending into at least one of said compartments, the inside of said gas collecting tube being substantially completely open throughout its length, the lower portion of said second compartment below one end of said gas collecting tube defining a settling basin, an atomizing nozzle positioned so as to discharge a scrubbing liquid upwardly into each said collecting tube countercurrent to the flow of dirty gas whereby high energy contact is achieved between the dirty gas and the scrubbing liquid, and means for circulating scrubbing liquid from said settling basin to said atomizing nozzle.

10. The gas scrubber according to claim 9 wherein said atomizing nozzle comprises a hollow tube having a discharge orifice and means in said hollow tube for delivering a compresed gas to a point below said discharge orifice whereby a mixture of scrubbing liquid and compressed gas is discharged into each said gas collecting tube.

11. A gas scrubber comprising a vessel having bottom, top and side walls, means dividing said vessel into first and second compartments, dirty gas inlet means in said first compartment, clean gas outlet means in said second compartment, at least one open-ended gas collecting tube mounted in said dividing means; the lower portion of said second compartment below said gas collecting tube defining a settling basin, an atomizing nozzle, and means for supplying a compressed gas to said atomizing nozzle for atomizing the scrubbing liquid and accelerating the atomized scrubbing liquid to a high velocity; said atomizing nozzle being positioned for discharging a mixture of compressed gas and scrubbing liquid into each gas collecting tube countercurrent to the flow of dirty gas whereby high energy contact is achieved between the dirty gas and the atomized scrubbing liquid.

12. A gas scrubber comprising a vessel, at least one gas collecting tube mounted in and having an open end communicating with said vessel; said gas collecting tube being substantially completely open throughout its length; dirty gas inlet means communicating with said tube; clean gas outlet means communicating with said vessel and separated from direct communication with the dirty gas inlet means; said vessel defining a settling basin below said tube; an atomizing nozzle; means for supplying a scrubbing liquid to said atomizing nozzle; and means for supplying a compressed gas to said atomizing nozzle for atomizing the scrubbing liquid and accelerating the atomized scrubbing liquid to a high velocity; said atomizing nozzle being positioned for discharging a mixture of compressed gas and atomized scrubbing liquid into the gas collecting tube countercurrent to the flow of dirty gas whereby high energy contact is achieved between the dirty gas and the atomized scrubbing liquid.

\* \* \* \* \*